United States Patent
Schenkel, III et al.

(10) Patent No.: US 7,681,704 B2
(45) Date of Patent: Mar. 23, 2010

(54) ELECTROMAGNETIC INERTIA BRAKE FOR A POWER INPUT SHAFT OF A POWER TRANSMISSION MECHANISM

(75) Inventors: John A. Schenkel, III, Ft. Wayne, IN (US); Michael J. Hornbrook, Butler, IN (US); Mark L. Beakas, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 537 days.

(21) Appl. No.: 11/637,412

(22) Filed: Dec. 12, 2006

(65) Prior Publication Data

US 2007/0095625 A1    May 3, 2007

Related U.S. Application Data

(63) Continuation-in-part of application No. 11/143,069, filed on Jun. 2, 2005, now Pat. No. 7,318,515, which is a continuation-in-part of application No. 10/760,665, filed on Jan. 20, 2004, now Pat. No. 7,000,748.

(51) Int. Cl.
*F16D 67/02* (2006.01)

(52) U.S. Cl. .............. 192/13 R; 192/84.94; 192/109 R; 188/164

(58) Field of Classification Search ............... 192/84.94
See application file for complete search history.

(56) References Cited

U.S. PATENT DOCUMENTS

| | | |
|---|---|---|
| 1,851,571 A | 3/1932 | Doman |
| 3,465,327 A | 9/1969 | Schroter et al. |
| 3,857,468 A | 12/1974 | Iritono et al. |
| 3,858,700 A * | 1/1975 | Kirschling ............... 192/111.1 |
| 3,893,191 A | 7/1975 | Gold et al. |
| 4,014,420 A | 3/1977 | Riese |
| 4,222,471 A | 9/1980 | Hsu |
| 4,694,945 A | 9/1987 | Koitabashi |
| 4,848,527 A | 7/1989 | Kamio |
| 4,848,531 A | 7/1989 | Gray et al. |
| 4,993,532 A * | 2/1991 | Weiss et al. ............... 192/111.1 |
| 5,172,798 A | 12/1992 | Mabee |
| 5,209,085 A | 5/1993 | Brien |
| 5,267,635 A | 12/1993 | Peterson et al. |
| 5,533,425 A | 7/1996 | Mabee |
| 5,559,286 A | 9/1996 | White et al. |
| 5,921,780 A | 7/1999 | Myers |
| 5,931,272 A | 8/1999 | Fukushima et al. |
| 6,105,743 A | 8/2000 | Salecker et al. |
| 6,139,467 A | 10/2000 | Kosik et al. |
| 6,622,836 B2 | 9/2003 | Otto et al. |
| 7,000,748 B2 | 2/2006 | Hornbrook et al. |

FOREIGN PATENT DOCUMENTS

DE    29 03 362 A1 *    7/1980
EP    0 822 354 B1      5/2001

* cited by examiner

*Primary Examiner*—Richard M. Lorence
(74) *Attorney, Agent, or Firm*—Brooks Kushman P.C.

(57) ABSTRACT

An electromagnetic brake for an input shaft of a vehicle transmission is disclosed. The brake includes an armature separated from an electromagnetic coil pole face by a controlled air gap. A spring release feature ensures precise armature disengagement when the brake is deactivated. A wear compensation feature maintains uniformity of the air gap.

20 Claims, 8 Drawing Sheets

ELECTROMAGNETIC INERTIA BRAKE FOR A POWER INPUT SHAFT OF A POWER TRANSMISSION MECHANISM

CROSS-REFERENCE TO RELATED APPLICATIONS

This application is a continuation-in-part of U.S. patent application Ser. No. 11/143,069, filed Jun. 2, 2005, now U.S. Pat. No. 7,318,515 entitled Electromagnetic Brake For A Multiple-Ratio Power Transmission In A Vehicle Powertrain, which is a continuation-in-pan of U.S. patent application Ser. No. 10/760,665, filed Jan. 20, 2004, entitled Clutch Brake, now U.S. Pat. 7,000,748, dated Feb. 21, 2006.

BACKGROUND OF THE INVENTION

1. Field of the Invention

An electromagnetic brake assembly for controlling rotary inertia forces in a road vehicle powertrain.

2. Background Art

A typical powertrain for a road vehicle, particularly a heavy-duty truck, includes an internal combustion engine and a multiple-ratio power transmission mechanism, together with a master disconnect clutch for establishing and disestablishing power flow paths from the engine through the multiple-ratio transmission mechanism. Ratio changes in the transmission mechanism are accomplished by shifting clutch elements into and out of engagement with companion gear elements. The ratio changes occur during a shift interval in which the vehicle operator disengages the master clutch.

A ratio change shift sequence typically involves disengagement of the master clutch to interrupt power flow from the vehicle engine to the torque input shaft of the transmission as the transmission clutch elements are selectively engaged and disengaged. When the master clutch is disengaged, a torque input shaft for the transmission must decelerate so that the gear elements of the on-coming torque flow path are generally in synchronism.

A brake may be used to facilitate shifting of the transmission gearing by decelerating the transmission torque input shaft, thereby decreasing the time required to accomplish a ratio shift and improving shift quality. The torque input shaft brake is especially useful when the vehicle driver initiates a shift from neutral to low ratio or from neutral to reverse following master clutch disengagement.

It is known in the art to provide a transmission input shaft brake that includes a friction member connected drivably, such as by splines, to the transmission torque input shaft. The transmission master clutch is disengaged by a master clutch release mechanism so that when the master clutch is disengaged, the release mechanism will apply a brake engaging force on the transmission input shaft brake. Friction brake elements of the input shaft brake thus are activated into frictional engagement, thereby creating a frictional drag torque that decelerates the transmission input shaft.

U.S. Pat. No. 7,000,748 discloses a transmission input shaft brake with an electromagnetic brake actuator. That patent is assigned to the assignee of the present invention. The electromagnetic brake disclosed in the '748 patent comprises an armature that is secured to the transmission input shaft adjacent a friction surface formed on an adjacent transmission housing wall. When the brake is energized, the armature frictionally engages a stationary friction surface on the transmission housing wall, thereby retarding or preventing rotation of the transmission torque input shaft at the outset of a ratio shift.

The electromagnetic brake of the '748 patent creates a magnetic flux flow path that is defined in part by a brake armature. The flux flow path envelopes portions of the transmission, including the transmission input shaft, a transmission input shaft bearing and bearing cover, and portions of a driver operated master clutch release mechanism.

The electromagnetic input shaft brake disclosed in the '748 patent includes a housing, which may replace a transmission input shaft bearing cap typically found on heavy-duty transmissions. The electromagnetic brake includes coil windings that are placed close to the input shaft to reduce the length of the coil windings and to reduce the amount of copper required in the manufacture of the coil. Typically, the electromagnetic brake is strategically positioned to minimize the space required to accommodate it in the transmission assembly.

The magnetic lines of flux created as the transmission input shaft brake is activated pass through the transmission input shaft and surrounding portions of the transmission that are of high carbon content, which may be magnetized following a period in which the transmission input shaft brake is frequently activated. It is possible, for example, for the transmission input shaft to be partially magnetized with a permanent residual magnetic intensity of about 0.5 to 1.0 Tesla. The transmission housing, which typically is formed of cast aluminum or cast iron with a low carbon content, does not readily become magnetized because those materials are relatively poor conductors for magnetic flux fields. The input shaft itself, however, as well as the bearing elements and other transmission elements and seal covers, are formed of high carbon steel and are in close proximity to the input shaft brake.

The return flux flow path in an arrangement of this type typically includes an armature plate of the input shaft brake, which may be a solid disk design because of its ease of manufacture and its low cost.

Because of partial or residual magnetization of transmission components in proximity to the input shaft brake, ferrous particles in an operating environment for the transmission can be attracted to rotary portions of the transmission and damage transmission bearings, seals and other transmission components.

The electromagnetic brake disclosed in the co-pending 069 patent application, now U.S. Pat. No. 7,318,515. which is assigned to the assignee of the present invention, includes a clutch hub that is splined or otherwise secured to a torque input shaft of a multiple-ratio transmission. The hub is drivably connected to a torque output side of the master clutch. The electromagnetic brake includes an armature that is drivably connected to a brake (clutch brake) hub through a flexible drive plate. Electromagnetic coil windings are positioned at a relatively increased radial distance from the axis of the torque input shaft to reduce the problem of residual magnetism. A controlled air gap exists between a friction surface on the armature, and a corresponding friction surface on a pole face for electromagnetic clutch windings located in the electromagnetic clutch housing. The electromagnetic clutch housing in turn is fixed to the transmission housing.

The electromagnetic clutch of the co-pending application lacks a clutch release feature that will maintain a desired air gap between the armature and the clutch face on the coil housing. Because of frictional drag that may be present following a command for disengagement of the electromagnetic brake, a clean release of the armature from frictional engagement with the coil housing following a braking cycle may not occur. Further, the spacing between the armature and the friction surface on the coil housing may not always be within design limits, following repeated application and release of the friction brake, since the flexible drive plate to which the armature is connected may not be capable of maintaining a controlled air gap when the electromagnetic brake is de-energized. Further, the release feature for the electromagnetic brake may not accommodate increases in the air gap due to friction surface for wear over the life of the brake.

SUMMARY OF THE INVENTION

The invention provides an efficient clutch release feature when the electromagnetic brake is de-energized, which will reduce frictional drag forces between the armature plate and an adjacent coil housing. The release feature comprises at least one low wear insert in an electromagnetic coil housing that is spring-loaded to effect a friction surface separation force in a direction opposite to the electromagnetic forces acting on the armature when the brake is energized. The low wear insert, according to one aspect of the invention, can be a spring-loaded armature release ring, which protrudes from the electromagnetic coil housing.

A minimum pre-calibrated air gap between the coil housing and the armature plate is provided when the brake is de-energized. When the coil is energized, the armature is pulled against the insert toward the coil housing. The insert moves with the armature during brake engagement so that the armature may complete a magnetic flux flow circuit whereby rotary inertial forces acting on the brake are opposed. The spring-loaded insert or ring is grounded to the coil housing and is designed so that the armature may "pull" into the housing throughout its operating life. When the coil is de-energized, the insert pushes the armature off the coil housing to establish the desired air gap.

A flexible drive plate allows an added degree of freedom between the armature plate and the brake hub. It is not affected by relative movement at the splined connection of the brake hub with the transmission power input shaft. Any shifting movement of the power input shaft due to manufacturing tolerances or wear will not affect the air gap.

According to another aspect of the invention, provision is made for compensating for wear at the interface of the armature and the friction surface on the coil housing. This is achieved by providing a driving connection between a reference plate, which carries the armature, and the coil housing. The driving connection includes a fastener with a slip joint feature that will establish an adjustment between the reference plate and the coil housing to compensate for a change in the air gap due to wear of the friction surfaces.

In one embodiment of the invention, the reference plate is engageable with an armature stop connected to the coil housing so that the air gap is precisely defined. In another embodiment, the reference plate is replaced by a housing cover that is spaced from the coil housing by a calibrated separation.

BRIEF DESCRIPTION OF THE DRAWINGS

FIG. 5 is an exploded view of the elements of the electromagnetic brake shown in FIGS. 4 and 4a;

FIG. 7a is a partial isometric subassembly view of a flexible drive plate and armature for the assembly of FIG. 7a, as well as the assembly of FIG. 4a;

FIG. 7b is a partial isometric subassembly view of a segmented armature plate for the electromagnetic brake illustrated in FIG. 7, as well as in FIG. 4a;

PARTICULAR DESCRIPTION OF AN EMBODIMENT OF THE INVENTION

Figure 1:
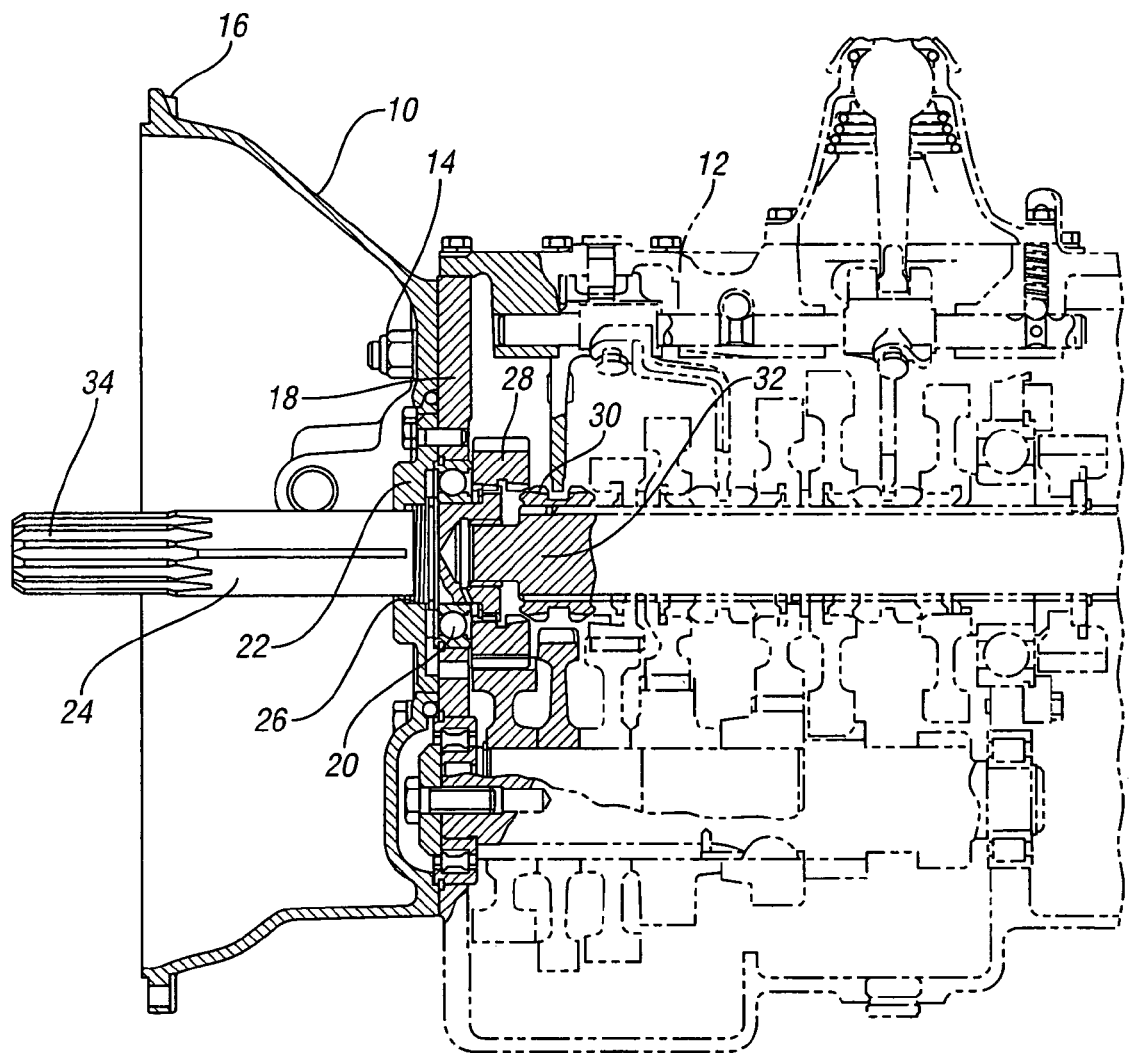
FIG. 1 is a partial cross-sectional view of a multiple-ratio heavy-duty power transmission mechanism capable of incorporating the present invention.

FIG. 1 shows a known multiple-ratio, heavy-duty truck transmission capable of embodying the electromagnetic input shaft brake (clutch-brake) of the invention. The transmission of FIG. 1 is an example of one of a number of transmissions that could incorporate the electromagnetic brake of the invention. For example, multiple-ratio transmissions in automotive powertrains with synchronizers for effecting synchronized engagement of torque transmitting gear elements could be used. Other transmissions that could be used would include automated ratio shifting transmissions with pneumatic or hydraulic shift actuators.

The transmission of FIG. 1 includes a clutch bell housing 10 and a main transmission housing 12 that may be secured together by bolts 14 to form a transmission housing assembly. The bell housing 10 may be bolted at 16 to the engine flywheel housing of an internal combustion engine.

The transmission housing includes a forward bearing support wall 18 with a central bearing opening that receives and supports a main transmission ball bearing 20. A bearing cap 22 is secured to the wall 18. A transmission input shaft 24 extends through the bearing cap and is supported by bearing 20. A lubrication oil seal 26 surrounds the input shaft 24 and is retained by the bearing cap 22.

Torque input shaft 24 may be drivably connected to a torque input gear 28 of the transmission mechanism. Gear 28 can be engaged drivably to countershaft gears in known fashion. It may be connected also by a dog clutch 30 to a transmission main shaft 32 in known fashion. Torque input shaft 24 is splined at 34 to establish a driving connection with an internally splined friction clutch hub 36, as seen in FIG. 2.

Figure 2:
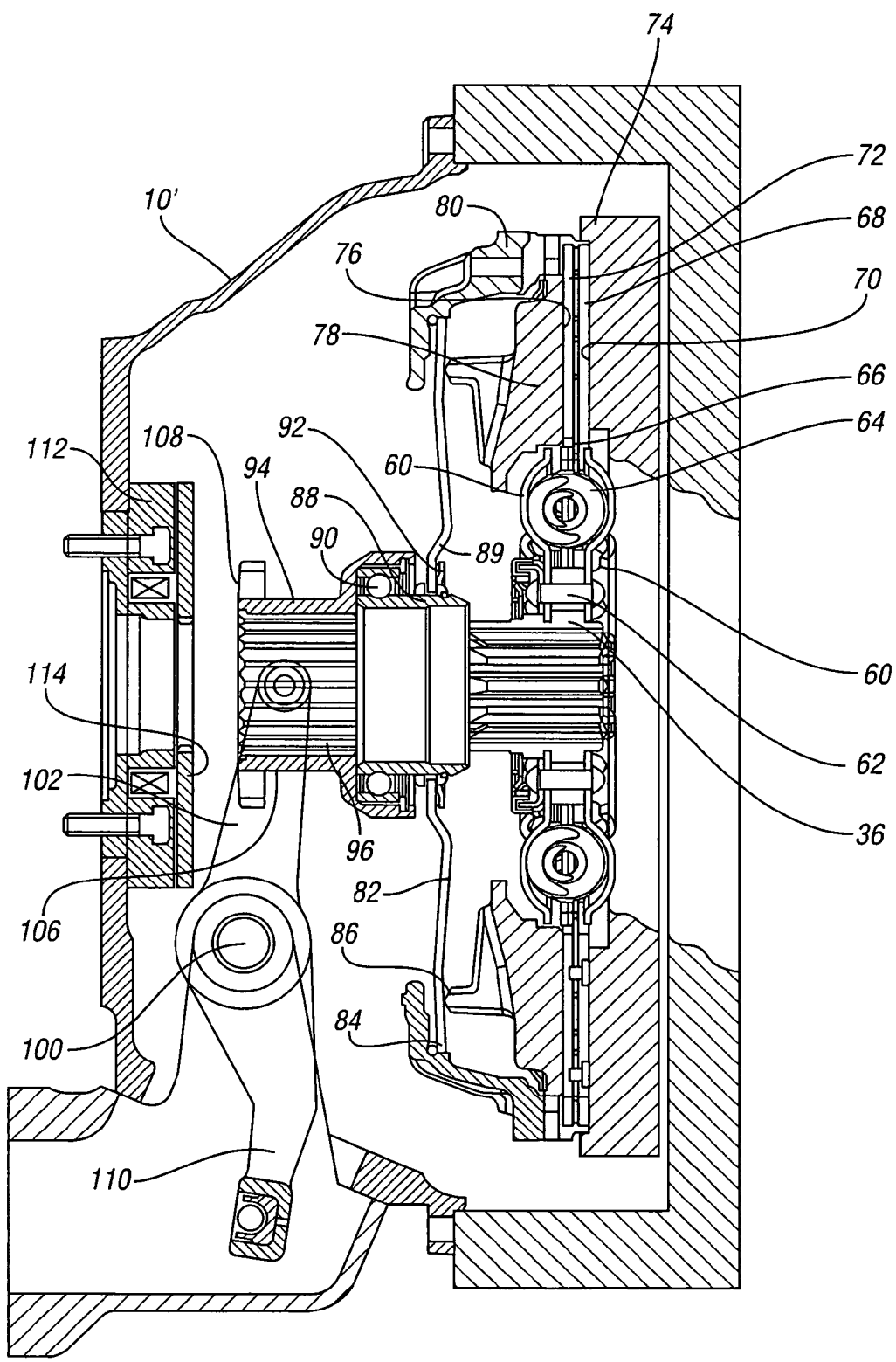
FIG. 2 is a partial cross-sectional view of a master clutch for the transmission of FIG. 1 and a known electromagnetic brake (clutch-brake) for the input shaft of the transmission.

FIG. 2 shows a master clutch construction as disclosed in the '748 patent for use in a transmission having an input shaft corresponding to the shaft 24 of FIG. 1. A damper spring cage 60 is secured drivably to the hub 36, preferably by rivet elements 62. Damper springs 64 are received in the cage 60. The springs 64 engage a clutch drive plate 66 thereby establishing a resilient driving connection between the hub 36 and the clutch drive plate 66. Clutch friction materials 68 and 72 are secured on both sides of the clutch drive plate 66. Friction material 68 is situated adjacent a friction surface 70 on engine flywheel 74. Friction material 72 is situated directly adjacent friction surface 76 of clutch pressure plate 78, which is located within rotary clutch housing 80, the latter being secured to engine flywheel 74 so that they rotate together. Pressure plate 78 is connected at its periphery to the clutch housing 80, the connection accommodating axial displacement of the pressure plate 78 relative to the clutch housing 80.

A diaphragm clutch actuator spring 82 is anchored at its periphery to the clutch housing 80, as shown at 84. An intermediate portion of the diaphragm actuator spring 82 engages a pressure point on the pressure plate 78, as shown at 86. The radially inward margin 89 of the diaphragm spring 82 surrounds an inner bearing race 88 for clutch release bearing assembly 90. Axial displacement of the inner race 88 will cause axial shifting movement of the inner periphery 89 of the diaphragm spring 82 as a collar 92 carried by the inner race 88 engages the periphery 89.

An outer race for the bearing 90 may be an integral portion of clutch release bearing sleeve 94, which is provided with lubricating grease grooves 96. Although grooves 96 extend in an axial direction, as indicated in FIG. 2, they may be formed in any of several other possible groove patterns, depending on design choice. The sleeve 94 may be slidably mounted on a bushing, not shown, that is fixed to the torque input shaft. For example, the bushing may be keyed to the torque input shaft. A typical keyway in shaft 24 is visible in FIG. 1. The clutch release mechanism includes a lever that is pivoted at 100 on the clutch bell housing. An arm 102 of the release lever has an actuator end, which enters an annular space 106 seen in FIG. 2. The space 106 is defined by a ring 108 secured to the sleeve 94 and by the release bearing 90. Sleeve 94 is movable axially, but it does not rotate about the torque input shaft axis.

The radially outward arm 110 of the release lever extends through the bell housing, shown at 10', which corresponds to the bell housing 10 of FIG. 1. A suitable actuator mechanism (not shown), which is under the control of the vehicle operator and which is mechanically connected to a transmission clutch pedal, will rotate the clutch release lever to effect shifting movement of the sleeve 94 in a left-hand direction against the opposing force of the diaphragm spring 82. The master clutch normally is engaged under the spring force of the diaphragm spring 82. When the clutch release sleeve 94 is shifted in a left-hand direction as seen in FIG. 2, the clutch engaging force at 86 is released, and the pressure plate 78 is shifted out of engagement with the clutch plate 66.

An electromagnetic coil housing 112 enclosing an electromagnetic coil is secured by fasteners to bell housing 10', as shown in FIG. 2. An armature plate 114, which is splined to the torque input shaft, not shown, is disposed adjacent coil housing 112 with an air gap therebetween.

Figure 3:
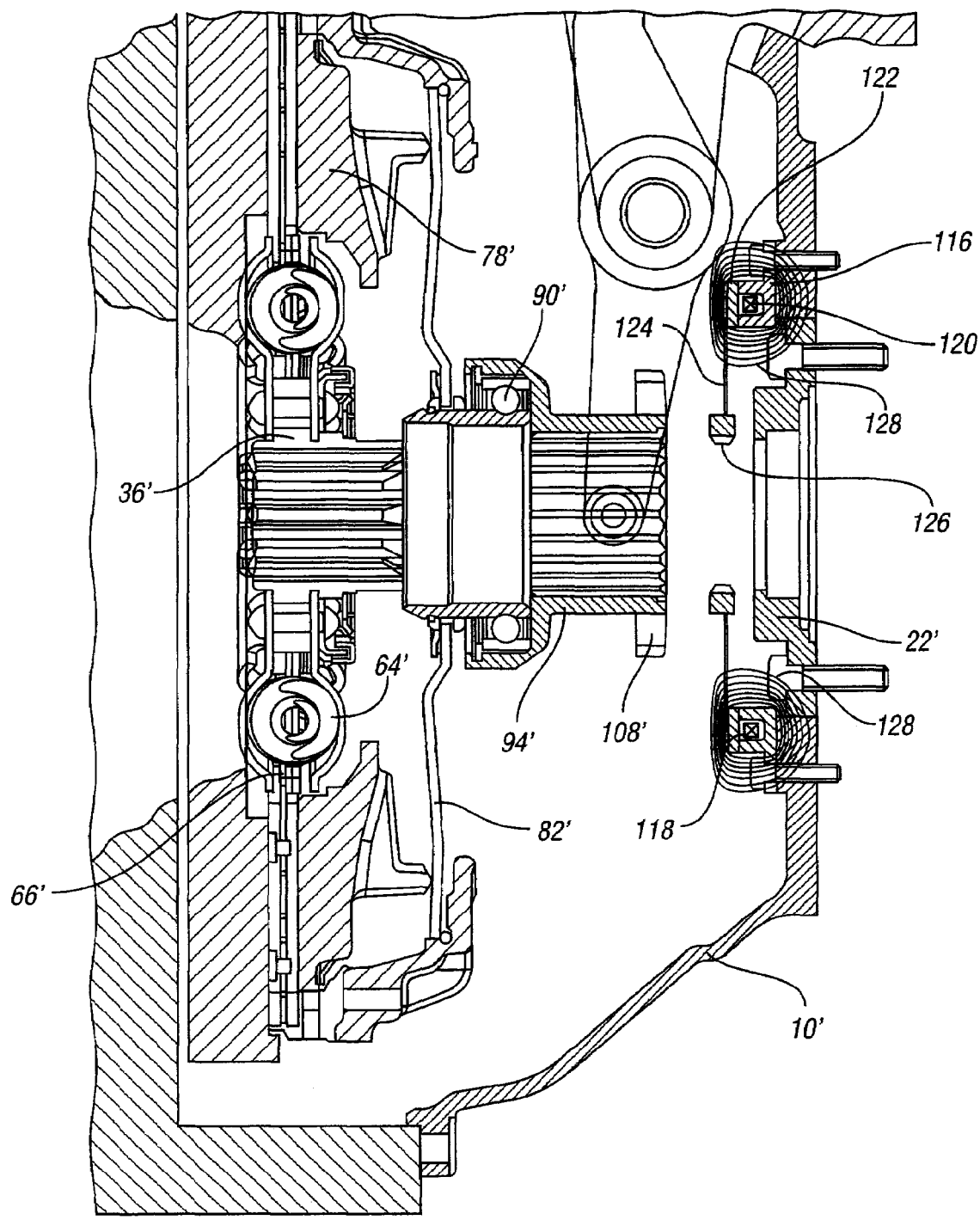
FIG. 3 is a partial cross-sectional view of a master clutch for the transmission of FIG. 1 and a known electromagnetic brake with a coil located radially outward from the transmission torque input shaft.

FIG. 3 shows the design disclosed in the co-pending '069 patent application wherein the electromagnetic clutch housing is physically separated from the torque input shaft for the transmission. In the design of FIG. 3, the bearing cap does not form a part of the electromagnetic clutch-brake housing. The bearing cap is illustrated in FIG. 3 at 22', which corresponds to the bearing cap illustrated in the known design of FIG. 1. At a radially outward location with respect to the bearing cap 22' is an electromagnetic clutch-brake housing 116.

The master clutch elements and the clutch release bearing of FIG. 3 may be similar to the clutch and clutch release bearing illustrated in FIG. 2. Reference numerals used in identifying the elements of the master clutch assembly in the clutch release bearing in FIG. 3 are the same as the corresponding elements of the FIG. 2 construction, although prime notations are added to numerals used in FIG. 3.

An electromagnetic clutch-brake coil housing 116 is provided with a pocket 118, which receives electromagnetic coil windings 120. They are remotely situated with respect to the transmission torque input shaft and the transmission main ball bearing. The clutch-brake coil housing 116 is bolted or otherwise secured to bell housing 10', although it could instead be secured to a transmission housing wall corresponding to housing wall 18 seen in FIG. 1. The bell housing 10', for purposes of this description, can be considered to be a part of the transmission housing.

A brake armature plate 122 is secured to the outer periphery of a flexible brake plate 124. The inner periphery of the brake plate 124 is secured to ring 126, which is splined to the transmission input shaft.

An electromagnetic flux flow pattern, shown at 128, is confined to a radially outward location relative to the input shaft so that it is relatively isolated from the clutch activation and the input shaft.

Figures 4, 4A:
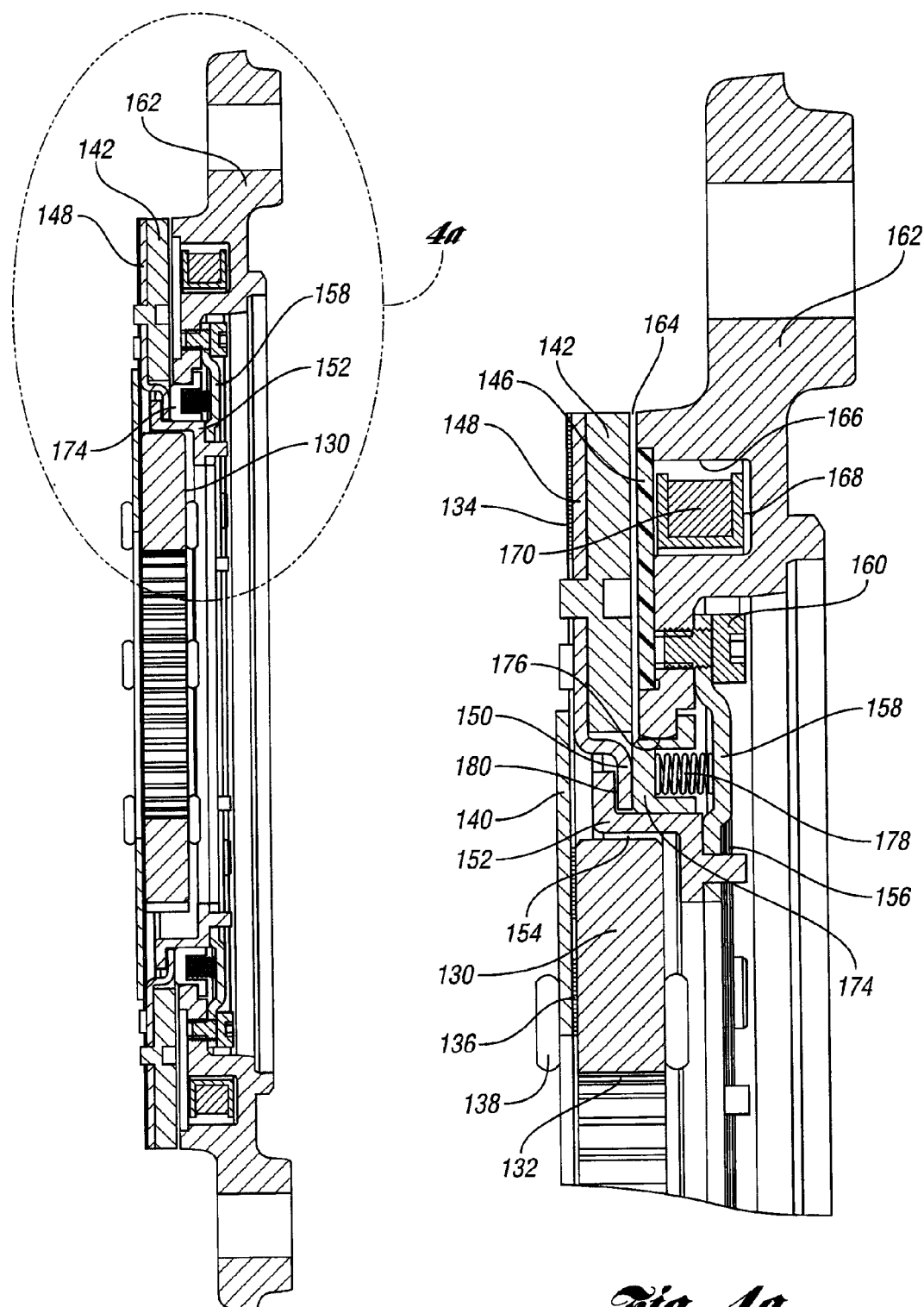
FIG. 4 is a cross-sectional view of a first embodiment of the invention.
FIG. 4a is a cross-sectional view in enlarged form showing the radially outward region of the electromagnetic brake illustrated in FIG. 4.

In FIGS. 4 and 4a are cross-sectional views that illustrate a first embodiment of the invention. Shown at 130 is an electromagnetic brake hub with an internal spline at 132, which registers with an externally splined portion of a transmission power input shaft of the kind shown at 24 in FIG. 1. A flexible drive plate or coupling 134 has flexible arms that are secured at a radially inward location to one radial face of hub 130, as shown at 136. This is best seen by referring to FIG. 5. The drive plate is secured to the hub 130 by rivets, as shown at 138 in FIG. 5. The cover plate or support plate, shown at 140, is also secured by the rivets 138 to the hub 130 so that the flexible plate 134 is sandwiched between the cover plate and the hub 130, thereby providing support for the flexible drive plate 134.

An armature plate 142 has arcuate armature segments 144, which engage a friction pad or friction ring 146.

The armature plate 142 is secured by rivets to an annular reference plate 148. The radially inward margin 150 of the reference plate 148 is offset, as shown in FIG. 4a and in FIG. 4, and is adapted to contact an armature stop ring 152, seen best in FIG. 5. A small clearance is provided, as shown at 154, between the armature stop 152 and the outside diameter of the brake hub 130.

The armature stop is secured, preferably by welding, to a spring support plate, as shown at 156. The spring support plate is identified by numeral 158 in FIGS. 4a and 5. The radially outward margin of the spring support plate 158 is secured by bolts 160 or by any other suitable fastener to coil housing 162 to define a spring support and coil housing subassembly. The friction pad 146 is mounted, as shown in FIG. 4a, on the radial face of the coil housing directly adjacent the armature 142. An air gap is provided between the juxtaposed surfaces of the armature plate and the friction pad, as indicated in FIG. 4a by reference numeral 164.

A coil pocket 166 formed in the coil housing 162 receives a bobbin 168, which includes electromagnetic coil windings 170 with a connector terminal shown at 162'.

Figure 5:
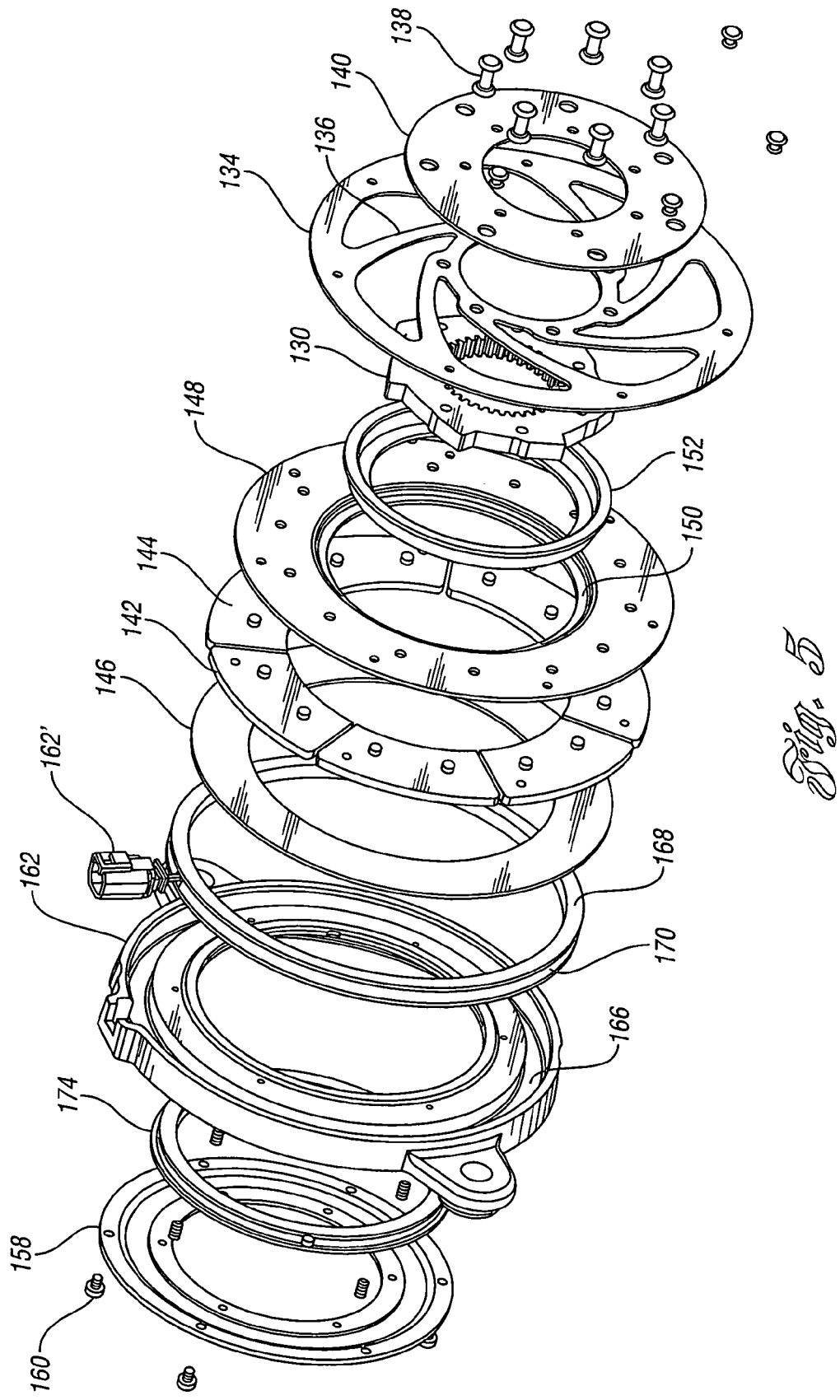

A spring release insert 174 is received in a central opening 176 in the coil housing 162. Although the insert 174 is shown in the form of a ring, as seen in FIG. 5, individual spring inserts spaced about the inner periphery of the coil housing could be used as well. In the case of the design of FIGS. 4a and 5, the insert 176 is formed with multiple pockets to receive release springs 178. Springs 178 are seated on the spring support plate 158.

Spring insert 174 engages the radially inward margin 150 of the reference plate 148.

When the insert engages the coil housing, before the electromagnetic coil windings 170 are energized a small air gap, shown at 180 in FIG. 4a, will be closed. At that time, the air gap 164 will be at a desired pre-calibrated value so that the electromagnetic clutch performance characteristics will be maintained throughout repeated engagement and disengagement cycles.

When the electromagnetic coil windings are energized, the armature plate 142 will move against the adjacent surface of non-metallic friction material of the friction pad, thereby causing the spring insert 174 to shift against the opposing force of springs 178. When the electromagnetic coil windings are de-energized, the armature is released from engagement with the friction material under the force of springs 178 as the pre-calibrated air gap at 164 is reestablished.

During engagement of the brake, the radial inwardly extending arms 136 of the flexible drive plate or coupling 134 will yield, thereby permitting precise motion of the armature plate into and out of engagement with the friction material.

Figure 6A:
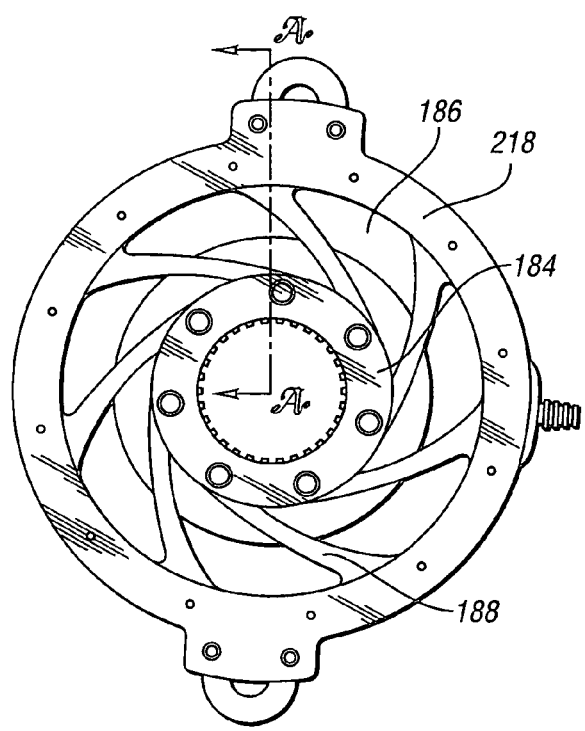
FIG. 6a is an end view of the electromagnetic brake illustrated in FIG. 6.
Figure 6:
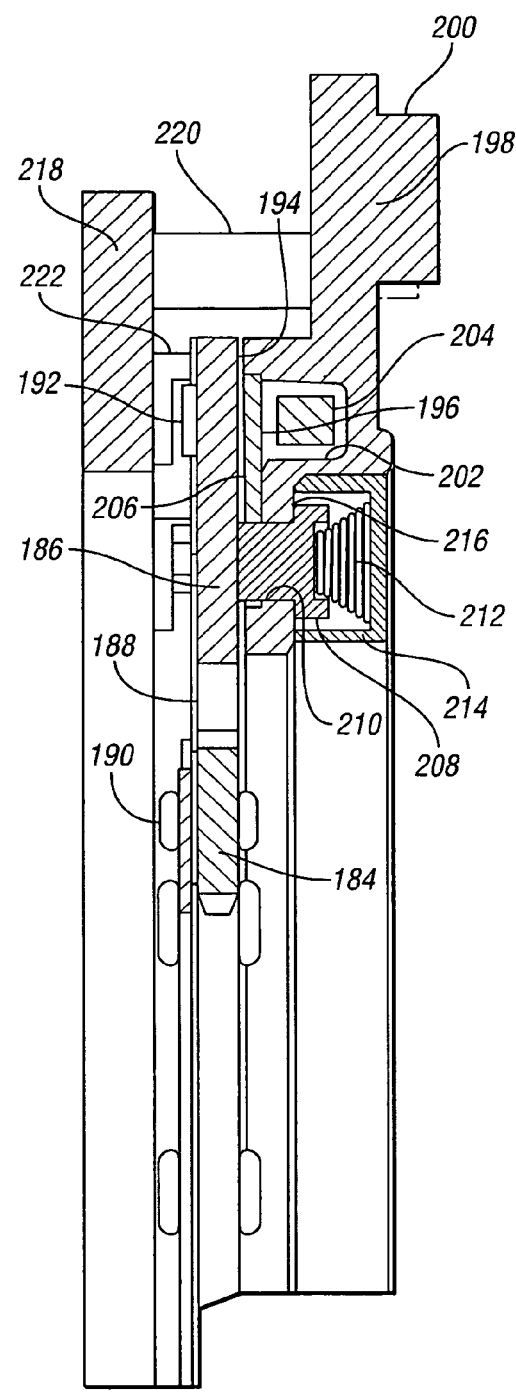
FIG. 6 is a partial cross-sectional view of a second embodiment of the invention.

A second embodiment of the invention, which is shown in FIG. 6, includes a brake drive hub 184. The torque input shaft for the transmission mechanism is splined to the drive hub 184.

An annular armature plate 186 is drivably connected to the drive hub 184 by flexible drive plate 188, which is best seen in FIG. 6a. The radially inward margin of the flexible drive plate 188 is connected by rivets 190 or by other suitable fastening techniques to the hub 184. The radially outward margin of the flexible drive plate 188 is secured to the armature plate 186 by rivets 192 or by other suitable fastening techniques.

A friction surface 194 on the armature plate 186 is situated adjacent an annular friction pad 196 secured to electromagnetic coil housing 198. Coil housing 198 is secured to the transmission housing at its radially outward margin 200.

Coil housing 198 is formed with a pocket 202, which receives electromagnetic coil windings 204 that encircle the geometric axis of drive hub 184.

A controlled air gap 206 is situated between the friction surface 194 of the armature plate and the friction pad 196. The size of the air gap is established by spring-loaded insert 208 slidably received in opening 210 in the coil housing 198. A light load conical spring 212, which is seated on a spring reaction element 214, urges the insert 208 into engagement with armature plate 186.

When the electromagnetic coil 204 is de-energized, the air gap 206 is established at a pre-calibrated value as the insert 208 engages a stop shoulder 216 on the coil housing 198. When the electromagnetic coil 204 is energized, the armature 186 is magnetically attracted to frictionally engage the friction pad 196.

An annular cover plate 218 is directly connected to the coil housing 198 by cover plate pins 220. The pins 220, located about the periphery of the cover plate 218, establish a precise spacing between the armature plate and the adjacent face of the cover plate. Cover plate stop members 222 secured to the cover plate about the inner periphery of the cover plate are engageable with the outer periphery of the flexible drive plate 188 and armature plate 186 to establish a precise limit for axial movement of the armature plate 186.

As in the case of the embodiment of FIGS. 4 and 4a, the spring-loaded insert of the embodiment of FIG. 6 will separate the armature from the coil housing at precisely the instant the coil windings 204 are de-energized. The springs 212 are calibrated to provide a sufficient brake release force that will overcome any residual magnetism or other frictional drag force that may exist as the brake is released. Further, the cover plate 218 of FIG. 6a, like the armature stop 152 and reference plate 148 of the embodiment of FIGS. 4 and 4a, will maintain the correct air gap between the armature and the adjacent friction material on the coil housing so that the engagement and release characteristics of the electromagnetic brake will be consistent throughout the operating life of the brake. The timing of the brake release and brake application established by the brake controller will be repeatable during each brake release and brake application cycle during the life of the brake.

Figure 7:
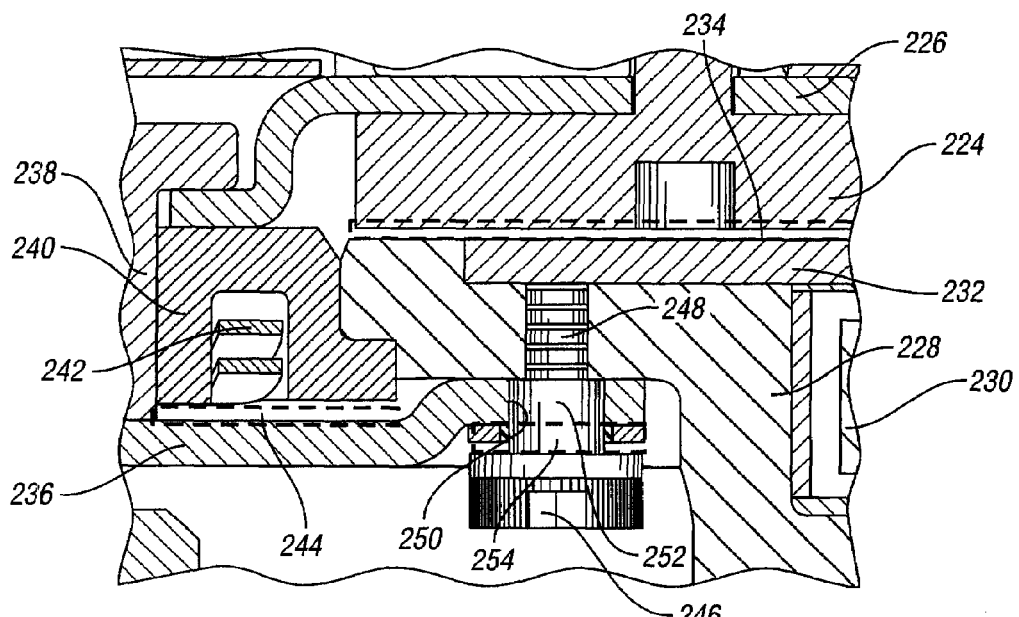
FIG. 7 is a partial cross-sectional view of a third embodiment of the invention, which includes a brake adjustment feature for compensating for wear at the brake friction surfaces.

A third embodiment of the invention is shown in FIG. 7. An armature plate 224, seen in FIG. 7, is secured to a reference plate 226, which corresponds to reference plate 148 of the first embodiment of FIGS. 4, 4a and 5. A coil housing 228, which corresponds coil housing 162 of the first embodiment, has an annular recess that receives electromagnetic coil windings 230. A friction pad 232, which corresponds to the friction pad of the first embodiment, seen at 146, is separated from armature 224 by an air gap 234.

Spring support 236 corresponds to spring support plate 158 of the first embodiment. A spring-loaded insert in the coil housing 228 urges the reference plate toward a brake release position under the force of spring 242. In the case of the embodiment of FIG. 7, the spring 242 may be an annular wave spring surrounding the geometric axis of the brake.

An air gap 244 is provided between the spring-loaded insert 240 and the spring support 236.

An automatic adjustment feature is provided in the embodiment shown in FIG. 7. It comprises a shoulder bolt fastener 246, which may be threaded into a threaded opening in the coil housing 228, as shown at 248. The spring support 236 has an opening 250 that receives a shoulder bolt 252. The shoulder bolt and the surrounding surface of the opening 250 define a slip joint interface that establishes a frictional connection between the spring support 236 and the coil housing 228. A gap 254 exists between the head of the shoulder bolt 246 and the spring support 236.

When the brake is energized, the air gap 244 between the spring support 236 and the spring-loaded insert 240 will close and the air gap between the armature segments 224 and the coil housing also will close. Assuming that the two air gaps are equal, the brake will not adjust. As the friction surfaces of the brake wear, the air gap between the armature and the coil housing, shown at 234, will increase to a value that is greater than the air gap 244. Upon a subsequent brake engagement, the armature will attempt to equalize the air gap of the insert 240, which is grounded on the spring support. This transfers a brake clamping force to the slip joint at 248. The designed slip joint interface then will allow a relative sliding movement once a specified load range is reached, and the spring support can move down the shoulder bolt, thereby causing the total wear travel at the gap 254 to decrease. The armature air gap at 234 will then once again equal the insert air gap at 244 and the brake will remain in adjustment to effect a faster response time and to improve wear capacity.

Figure 8:
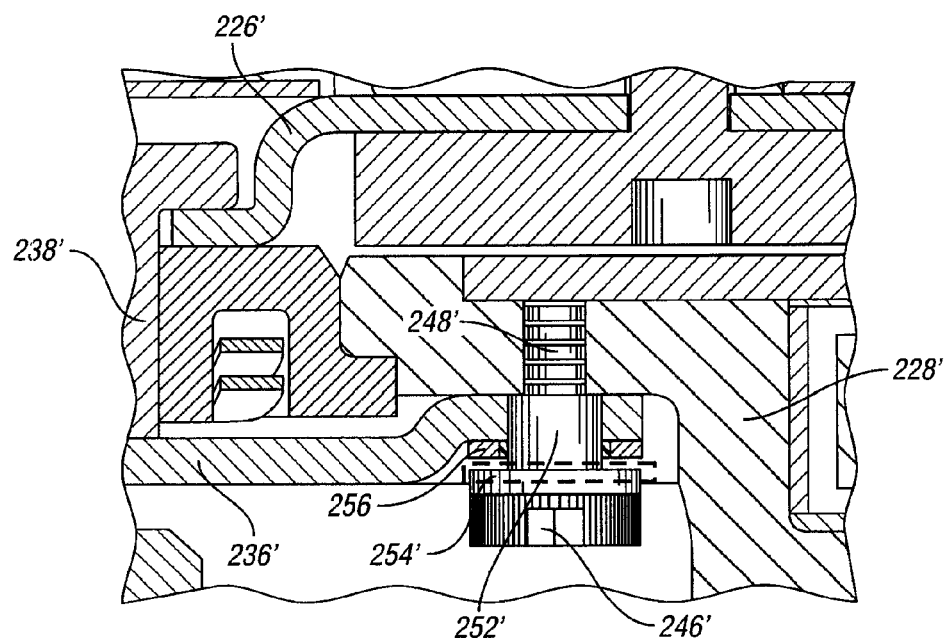
FIG. 8 is a partial cross-sectional view showing an alternate form of the adjustment feature illustrated in FIG. 7.

FIG. 8 shows a modification of the adjustment feature shown in FIG. 7. The brake elements seen in FIG. 7 have been repeated in FIG. 8, although prime notations are added to the numerals used in FIG. 8 to identify corresponding elements.

The embodiment of FIG. 8 includes a washer with a rubber on its inner periphery, which provides a tight interface between the bolt 246' and the spring support 236', as shown at 256. The rubber at the interface of the spring support and the bolt is best seen in FIG. 8a at 258.

The use of the rubber (or polymer) washer on the bolt 246' will allow a more loose fitting with increased tolerances on the spring support and the slip joint interface.

Figure 8A:
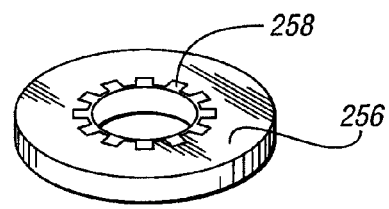
FIG. 8a is a detailed isometric view of a washer that forms a part of the adjustment feature illustrated in FIG. 8.

In the design shown in FIG. 8a, the rubber at the interface can be molded into pockets, or spline openings, at the inner periphery of the washer.

Figure 9:
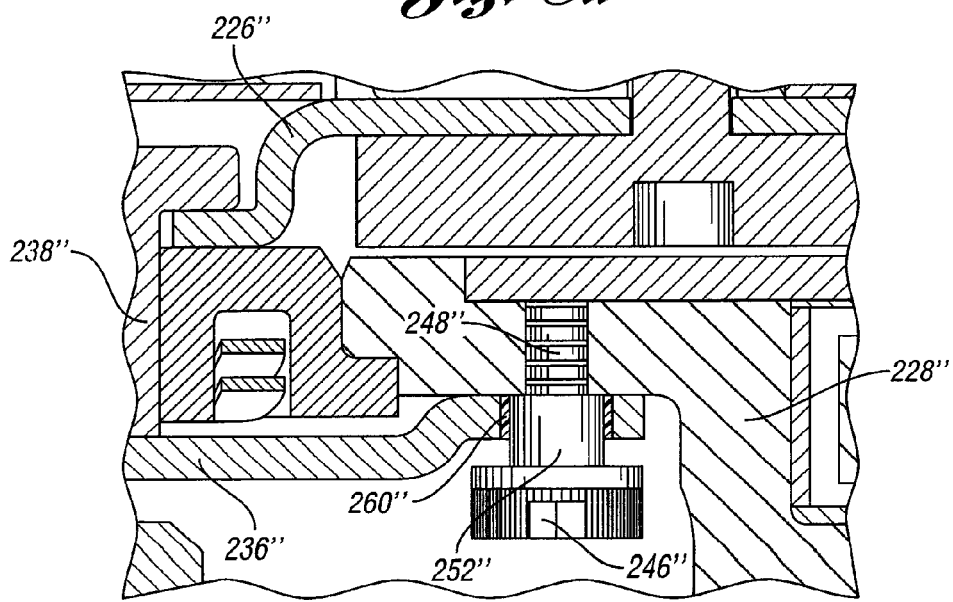
FIG. 9 is a partial cross-sectional view illustrating an alternate design for a slip joint at the interface of a spring support and coil housing of the electromagnetic brake.

An alternative washer design and slip joint interface is shown in FIG. 9. In the case of FIG. 9, reference numerals with double prime notations identify corresponding brake elements in the design of FIG. 7. In the case of the design of FIG. 9, a molded rubber interface 260" surrounds the inner periphery of the opening in the spring support 236" through which the bolt shoulder 252" extends. Thus, the molded rubber would define the outside diameter of the slip joint interface.

Figure 7A:
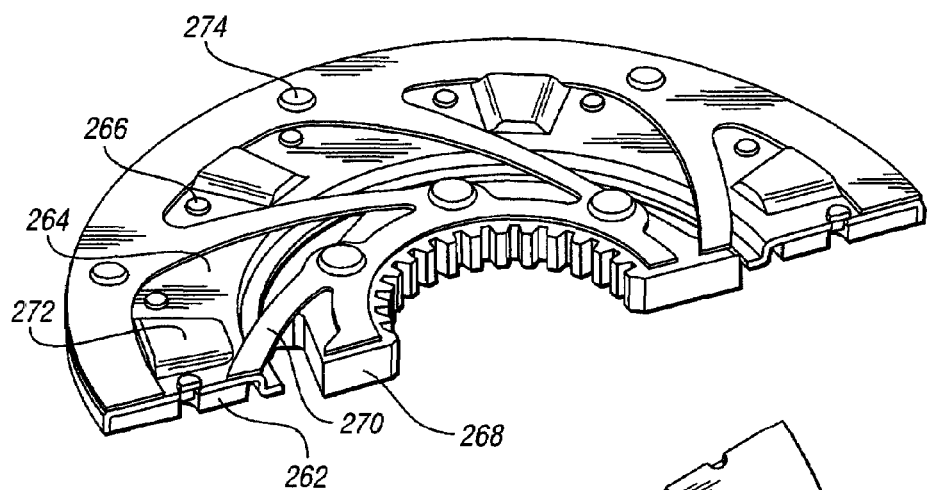

FIG. 7a shows the armature and flexible drive plate assembly for the embodiment of FIG. 6. The armature segments, shown at 262 in FIG. 7a, are attached to reference plate 264 using a semi-pierced rivet connection, shown at 266. As in the case of the previously described embodiments, the reference plate is connected to a hub, shown at 268, by a flexible drive plate 270.

The reference plate of FIG. 7a may include stamped cooling ducts 272. These cooling ducts have multiple functions. First, it connects the armature segments to the reference plate and provides an uninterrupted contact surface for the clutch release feature previously described. It also provides cooling air flow in a radial direction through the ducts while the transmission input shaft rotates. The armature segments and the reference plate are attached to the flexible drive plate with armature rivets, as shown at 274.

Figure 7B:
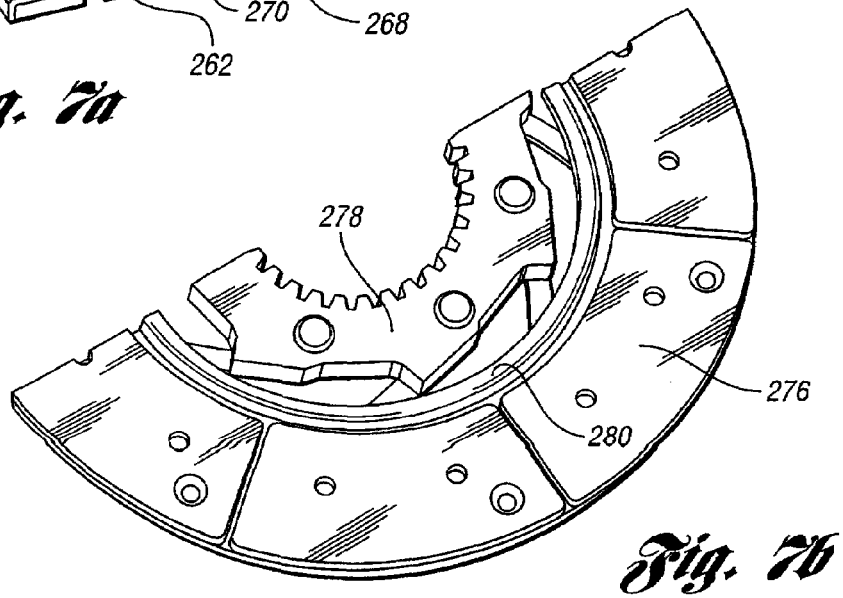

FIG. 7b shows in detail the placement of armature segments 276 relative to a brake hub 278. The armature segments are secured by rivets as shown to reference plate 280. The design of FIG. 7b can be used with each of the previously described embodiments of the invention.

In each of the embodiments, the response time for a controller command to apply the brake is reduced by having the armature located close to the coil housing throughout the life of the brake. Brake performance is improved by maintaining an air gap within pre-determined limits using the cover plate design or the reference plate design and by using the spring release feature. This is accomplished also in the case of a brake having a wear compensation feature by keeping the air gap constant. The design slip load, in the case of a brake having the wear compensation feature, must be higher than that of the spring release insert feature. This will prevent the brake from over-adjusting. The wear compensation feature causes the amount of travel of the armature to increase until the spring loaded insert will bottom out on the spring support. The force between the armature assembly and the coil housing increases exponentially with the decrease in the size of the air gap.

Although embodiments of the invention have been disclosed, it will be apparent to persons skilled in the art that modifications may be made without departing from the scope of the invention. All such modifications and equivalents thereof are intended to be covered by the following claims.

What is claimed is:

1. An electromagnetic brake for a power input shaft of a multiple-ratio transmission mechanism in a vehicle powertrain having an engine and a disconnect clutch between the power input shaft and the engine;

the electromagnetic brake having an armature drivably connected to the power input shaft;

an electromagnetic coil housing connected to a housing for the transmission mechanism;

an electromagnetic coil in the coil housing adjacent the armature, the electromagnetic coil and the coil housing defining an electromagnetic pole face, the armature and the pole face defining a pre-determined air gap therebetween; and a spring-loaded insert carried by the coil housing for applying a brake disengaging force on the armature when the armature is attracted toward the pole face as the electromagnetic coil is energized, whereby the armature is released from frictional contact with the pole face when the electromagnetic coil is de-energized.

2. The electromagnetic brake set forth in claim 1 wherein the transmission mechanism includes gear shift structure for interrupting a geared power flow path for one transmission mechanism ratio and establishing a geared power flow path for another transmission mechanism ratio during a ratio shift event.

3. The electromagnetic brake set forth in claim 2 wherein the disconnect clutch is disengaged to interrupt the geared power flow path for the one transmission mechanism ratio, the electromagnetic coil being energized when the disconnect clutch is disengaged whereby rotary inertia forces are opposed during a ratio change.

4. The electromagnetic brake set forth in claim 1 wherein the transmission mechanism includes a gear shift structure for establishing a geared power flow path for the transmission when the disconnect clutch is engaged;

the transmission mechanism having a neutral state which interrupts the geared power flow path;

when the disconnect clutch is disengaged, whereby rotary inertia forces are opposed during a shift from the neutral state to a power delivery state.

5. The electromagnetic brake set forth in claim 4 wherein the spring-loaded insert comprises an annular ring disposed in an annular recess in the coil housing; and at least one spring disposed between the coil housing and the annular ring whereby a residual magnetic force and other frictional drag forces acting on the armature are overcome as the electromagnetic coil is de-energized.

6. The electromagnetic brake set forth in claim 1 wherein the coil housing includes friction material on the pole face of the coil housing, whereby the armature frictionally engages the friction material as the electromagnetic coil is energized and the air gap closes.

7. The electromagnetic brake set forth in claim 1 wherein the spring-loaded insert comprises an annular ring disposed in an annular recess in the coil housing; and at least one spring disposed between the coil housing and the annular ring whereby a residual magnetic force and other frictional drag forces acting on the armature are overcome as the electromagnetic coil is de-energized.

8. The electromagnetic brake set forth in claim 1 wherein the coil housing comprises an annular cover plate with a radially extending stop surface disposed in axially aligned disposition with respect to the armature, whereby limited displacement of the armature away from the coil housing occurs as the electromagnetic coil is de-energized.

9. An electromagnetic brake for a power input shaft of a multiple-ratio transmission in a vehicle powertrain having an engine and vehicle traction wheels, the transmission defining multiple ratio power flow paths from the engine to vehicle traction wheels;

the electromagnetic brake having an armature drivably connected to a power input shaft for the transmission;

an electromagnetic coil housing connected to a housing for the transmission;

an electromagnetic coil in the coil housing adjacent the armature, the electromagnetic coil and the coil housing defining an electromagnetic pole face, the armature and the pole face defining a pre-determined air gap therebetween; and an armature stop member connected to the coil housing adjacent the armature for limiting movement of the armature away from the electromagnetic pole face as the electromagnetic coil is de-energized, thereby maintaining the pre-determined air gap.

10. The electromagnetic brake set forth in claim 9 wherein the armature comprises an annular reference plate;

the armature stop having a portion thereof adjacent one margin of the reference plate whereby the reference plate is adapted to engage the armature stop portion as the electromagnetic coil is de-energized, whereby the armature is precisely located when the electromagnetic brake is released.

11. The electromagnetic brake set forth in claim 10 wherein the coil housing has a recess for receiving a spring-loaded armature release insert;

the reference plate engaging the armature release insert as the armature moves toward the coil housing when the electromagnetic coil is energized whereby an armature release force is established as the brake is engaged.

12. The electromagnetic brake set forth in claim 9 wherein the reference plate is adapted to carry air flow cooling ducts defining a flow path for radial flow of cooling air to cool the brake.

13. The electromagnetic brake set forth in claim 9 wherein the coil housing has a recess for receiving a spring-loaded armature release insert;

an armature release insert for applying a brake disengaging force on the armature as the armature moves toward the coil housing when the electromagnetic coil is energized whereby an armature release force is established as the brake is engaged.

14. The electromagnetic brake set forth in claim 9 wherein the armature stop member comprises an annular cover plate with a radially extending stop surface disposed in axially aligned disposition with respect to the armature whereby limited displacement of the armature away from the coil housing occurs as the electromagnetic coil is de-energized.

15. An electromagnetic brake for a power input shaft of a multiple-ratio transmission in an engine powered vehicle powertrain having multiple geared power flow paths through the transmission to vehicle traction wheels;

the electromagnetic brake having an armature connected drivably to a power input element of the transmission;

an electromagnetic coil housing connected to a housing for the transmission;

an electromagnetic coil in the coil housing adjacent the armature a spring-loaded insert and spring carried by the coil housing, the spring-loaded insert being adjustable by the spring relative to the coil housing in a direction parallel to a geometric axis of the power input shaft;

an insert stop in the coil housing whereby movement of the spring-loaded insert effects movement of the armature to establish a first controlled air gap between the armature and the coil housing;

a spring support element for anchoring the spring; and an adjustable slip joint between the spring support element and the coil housing;

the spring-loaded insert and the spring support element having a second controlled air gap therebetween;

the adjustable slip joint yielding under a predetermined friction brake force when the first air gap, due to wear at the armature and coil housing interface, increases relative to the second air gap whereby the electromagnetic brake will remain in adjustment to effect a fast response to a braking command and to effect optimum brake wear capacity.

16. The electromagnetic brake set forth in claim 15 wherein the armature comprises an annular reference plate and at least one friction pad carried by the reference plate; and the insert stop has portion thereof adjacent the spring-loaded insert whereby the reference plate is adapted to engage the insert stop portion as the electromagnetic coil is de-energized, the spring support being is precisely located relative to the armature as the slip joint is adjusted when the electromagnetic brake is applied.

17. The electromagnetic brake set forth in claim 15 wherein the adjustable slip joint establishes a mechanical connection between the spring support element and the coil housing to define a spring support element and coil housing sub-assembly, the adjustable slip joint including a shoulder fastener with a portion secured to the coil housing, a shoulder portion of the fastener being adapted to engage the spring support and coil housing sub-assembly, the fastener having a head portion, a spacing between the head portion and the spring support element and coil housing sub-assembly defining an available travel of the spring support element relative to the head portion to accommodate wear at an interface of the armature and the coil housing.

18. The electromagnetic brake set forth in claim 17 wherein the adjustable slip joint includes a washer between the spring support element and the shoulder bolt, the washer having a molded ring through which the shoulder fastener extends, the ring establishing a tight frictional interface between the shoulder fastener and the spring support element.

19. The electromagnetic brake set forth in claim 18 wherein the ring is molded to the spring support element and coil housing sub-assembly.

20. The electromagnetic brake set forth in claim 18 wherein the ring is molded to the washer.

* * * * *

UNITED STATES PATENT AND TRADEMARK OFFICE
CERTIFICATE OF CORRECTION

| | | |
|---|---|---|
| PATENT NO. | : 7,681,704 B2 | Page 1 of 1 |
| APPLICATION NO. | : 11/637412 | |
| DATED | : March 23, 2010 | |
| INVENTOR(S) | : John A. Schenkel, III et al. | |

It is certified that error appears in the above-identified patent and that said Letters Patent is hereby corrected as shown below:

Column 11, Line 51, Claim 15,:

After "armature" insert -- ; --.

Column 12, Line 25, Claim 16,:

After "being" delete "is".

Signed and Sealed this
Fourth Day of January, 2011

David J. Kappos
*Director of the United States Patent and Trademark Office*